(12) United States Patent
Speggiorin

(10) Patent No.: US 6,913,231 B2
(45) Date of Patent: Jul. 5, 2005

(54) TELESCOPIC STAND FOR OPTICAL OR PHOTOGRAPHIC APPARATUS AND THE LIKE

(75) Inventor: Paolo Speggiorin, Mussolente (IT)

(73) Assignee: Lino Manfrotto & Co. S.p.A., Bassano del Grappa (IT)

( * ) Notice: Subject to any disclaimer, the term of this patent is extended or adjusted under 35 U.S.C. 154(b) by 160 days.

(21) Appl. No.: 10/332,054

(22) PCT Filed: Jul. 2, 2001

(86) PCT No.: PCT/EP01/07527

§ 371 (c)(1),
(2), (4) Date: Jan. 3, 2003

(87) PCT Pub. No.: WO02/06721

PCT Pub. Date: Jan. 24, 2002

(65) Prior Publication Data

US 2003/0146354 A1 Aug. 7, 2003

(30) Foreign Application Priority Data

Jul. 14, 2000 (IT) .................................... PD2000A0181

(51) Int. Cl.⁷ .............................................. F16M 11/32
(52) U.S. Cl. .................... 248/169; 248/171; 248/188.5; 403/109.3; 403/109.5
(58) Field of Search ................................. 248/168, 169, 248/170, 171, 411, 412, 414, 188.5, 336, 337; 403/109.3, 109.5, 109.8, 109.2

(56) References Cited

U.S. PATENT DOCUMENTS

| 2,687,866 | A | | 8/1954 | Johnson | 248/168 |
|---|---|---|---|---|---|
| 3,589,757 | A | * | 6/1971 | Mooney | 403/105 |
| 4,029,279 | A | * | 6/1977 | Nakatani | 248/188.5 |
| 4,047,821 | A | * | 9/1977 | Hoke et al. | 403/109.3 |
| 4,174,900 | A | * | 11/1979 | Ina | 248/163.1 |
| 4,185,936 | A | * | 1/1980 | Takahashi | 403/104 |
| 4,360,283 | A | * | 11/1982 | Psotta | 403/104 |
| 4,596,484 | A | * | 6/1986 | Nakatani | 403/104 |
| 4,666,112 | A | | 5/1987 | Jaumann | 248/169 |
| 4,761,092 | A | * | 8/1988 | Nakatani | 403/104 |
| 5,154,449 | A | * | 10/1992 | Suei-Long | 285/298 |
| 5,186,429 | A | * | 2/1993 | Linnepe et al. | 248/354.1 |
| 5,348,297 | A | * | 9/1994 | Parsons | 463/47.7 |
| 5,887,835 | A | | 3/1999 | Hein et al. | 248/161 |
| 6,306,040 | B1 | * | 10/2001 | Chang | 463/47.7 |
| 6,702,482 | B2 | * | 3/2004 | Sherwin | 396/428 |

FOREIGN PATENT DOCUMENTS

GB 6303 * 5/2000 .............. 248/188.5

* cited by examiner

Primary Examiner—Jon Szumny
(74) Attorney, Agent, or Firm—Merchant & Gould P.C.

(57) ABSTRACT

A telescopic stand is described and comprises at least two legs (2) and, for each leg, at least two elements (5, 6, 7) which are slidable telescopically relative to one another, locking means (12) on each leg (2), the locking means (12) being switchable between a locking condition and a release condition in which relative sliding between the elements of the respective leg (2) is prevented at least in one direction, or is unrestricted, respectively, and the locking means being switched to the release condition in at least one predetermined condition of relative positioning of the legs (2). The locking means comprises respective facing and opposed appendages (24b) which project towards one another from the respective legs (2) and, when pressed against one another, can interact with one another in the release condition when the legs (2) are gathered together.

9 Claims, 2 Drawing Sheets

TELESCOPIC STAND FOR OPTICAL OR PHOTOGRAPHIC APPARATUS AND THE LIKE

TECHNICAL FIELD

The subject of the present invention is a telescopic stand for optical or photographic apparatus and the like, according to the preamble to the main claim.

TECHNOLOGICAL BACKGROUND

In these stands, there is a need to facilitate initial and final positioning operations, enabling the legs to be extended quickly and simultaneously or, conversely, to be returned rapidly from the extended position to a fully retracted position.

For this purpose, it is known to provide controls which enable the locking systems of the three legs to be controlled simultaneously. An example of this technology is described in U.S. Pat. No. 4,666,112. This document provides for each tripod leg to comprise only two elements which are slidable telescopically relative to one another; with the three locking means operated simultaneously by a single common sleeve control associated with a central pillar and connected to the legs by means of the three arms of a spreader. A disadvantage of this device is that the spreader imposes a specific and predetermined relative positioning of the legs, limiting the versatility of use of the tripod. It also controls only one telescopic extension for each leg.

The simultaneous control of two or more extensions of a particular tripod leg is also known from U.S. Pat. No. 5,887,835.

However, this technical solution enables the three legs to be controlled simultaneously only by a complex manoeuvre to operate all of the locking devices on the legs at the same time.

DESCRIPTION OF THE INVENTION

The technical problem underlying the invention is that of providing a telescopic stand, typically constructed in the form of a tripod, which is designed structurally and functionally to overcome all of the disadvantages discussed with reference to the prior art mentioned.

This problem is solved by the invention by a telescopic stand formed in accordance with the appended claims.

BRIEF DESCRIPTION OF THE DRAWINGS

The characteristics and the advantages of the invention will become clearer from the detailed description of a preferred but not exclusive embodiment thereof, given by way of non-limiting example with reference to the appended drawings, in which.

PREFERRED EMBODIMENT OF THE INVENTION

Figure 2:
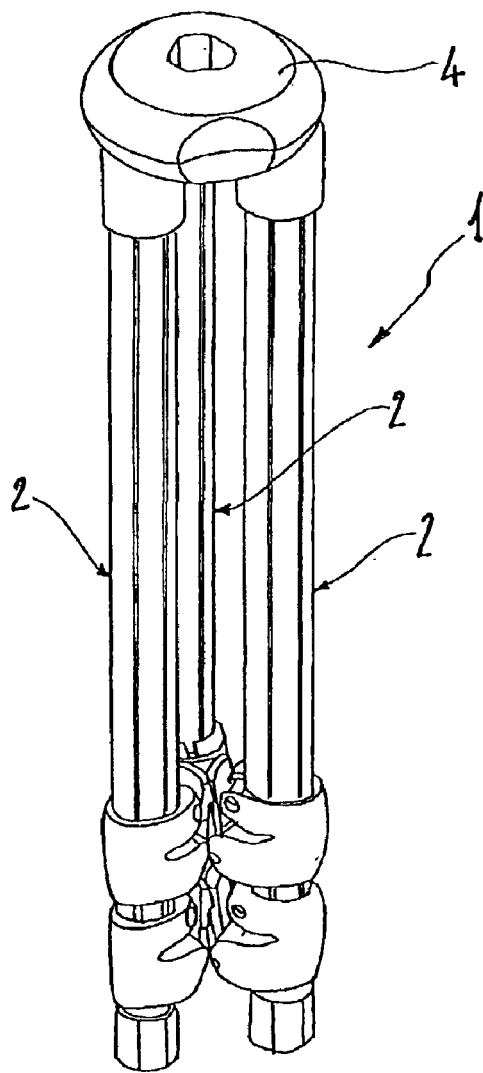
FIG. 2 is a perspective view of the tripod of FIG. 1, in the closed position.

In the drawings, a telescopic tripod stand (hereinafter referred to briefly as a "tripod"), formed in accordance with the invention, is generally indicated 1. It will be appreciated that the number of legs with which the stand is equipped is irrelevant per se, since similar stands with two or more legs can in any case be produced with the use of the teaching given below.

The tripod 1 comprises three identical legs, all indicated 2, articulated to a spider 4. Each leg comprises three elements 5, 6, 7, the element 6 being slidable telescopically in the element indicated 5, and the element 7 in the element indicated 6. The element 7 also has a ferrule 8 at its free end. All of the above-mentioned elements are tubular with approximately triangular cross-sections with broadly rounded angles.

The element 5 has a uniform cross-section with one end fixed in a cup 9 which bears an articulation element 10 for the pivotable connection of the leg to the spider 4. The cup 9 carries in its interior a plug 11, the function of which will be explained below.

At the end remote from the cup 9, the element 5 carries a locking device 12 including a collar-like element 13 which extends around a seat 14 in which the element 5 is housed in abutment with a shoulder 15 and is clamped by means of a screw 16. A guide portion 17 extends, coaxially with the seat 14, beyond the shoulder 15 and has a cross-section such as to house the element 6 with slight radial clearance to permit axial sliding thereof.

The guide portion 17 has an opening 18 in which a restraining pad 19 is mounted so as to be movable away from and towards an operative position in which it is urged against the element 6 by means of a lever control 20. The pad 19 is shaped, in cross-section, with two opposed and facing surfaces 19a, 19b which can contact two corresponding rounded corners of the element 6. On its opposite face there is a track 21 defined longitudinally by opposed ramps 22. The track 21 serves to restrain the pad relative to a cylindrical element 23 having the function of an adjustable fulcrum for the lever control 20. The control 20 includes a lever 24 articulated to the collar-like element 13 by means of a pin 24a and acted on by a spring 25 so as to push the pad 19 to the operative, restraining position. Each lever 24 has an operating appendage 24b projecting from the respective leg towards the corresponding facing and opposed appendages projecting from the other three legs.

The position of the cylindrical element 23 is adjustable relative to the pin 24a in order to vary the restraining effect of the pad, by means of an adjustment device 26 including a stay-bolt 27 which can tighten a locator 28 in order to vary the width of a groove 29 with inclined sides which is defined between the locator 28 and the end of the lever facing the locator, and in which the cylindrical element 23 is housed. If the groove 29 is constricted, the cylindrical element 23 is caused to project to an adjustable extent by the lever and thus correspondingly varies the load exerted by the spring 25.

It will be noted that the coupling between the pad 19 and the lever control 20 resulting from the interaction between the cylindrical element 23 and the ramps 22 of the track 21 is such that the application of a load tending to compress the legs axially brings about an increase in the restraining load of the pad, whereas the application of a tensile load on the legs brings about a decrease in the restraining load so that it is always possible to extend the legs manually without the need to operate the lever control devices, whereas the legs are locked in the opposite direction.

A similar locking device 12' is fitted on the corresponding end of the leg element 6 for adjusting the extension of the element 7. Since the devices 12 and 12' are identical, the description of the device 12 just given also applies to the device 12'. Corresponding details are indicated by the same reference numerals.

Each of the elements 6 and 7 is formed, at its end facing the cup 9, with an enlarged portion 30 which defines an external step 31 that can interact with the shoulder 15 to prevent the element from accidentally slipping out of the locking device disposed around it. The enlarged portion 30 also serves for maintaining correct guiding of the element 6, 7 in question.

Finally, it should be noted that, when the leg is in the fully retracted position, the plug 11 ensures that the retracted position is maintained by interacting with slight friction against the inner wall of the element 7, preventing the legs from unintentionally being extended during the handling of the tripod.

In practice, if the legs are to be extended, starting from the position of minimal opening of the tripod of FIG. 1, in which the legs are opened out by the minimal distance permitted by the condition purely of contact between the free ends of the operating appendages of the three levers 24, the tripod operates as follows.

Figure 1:
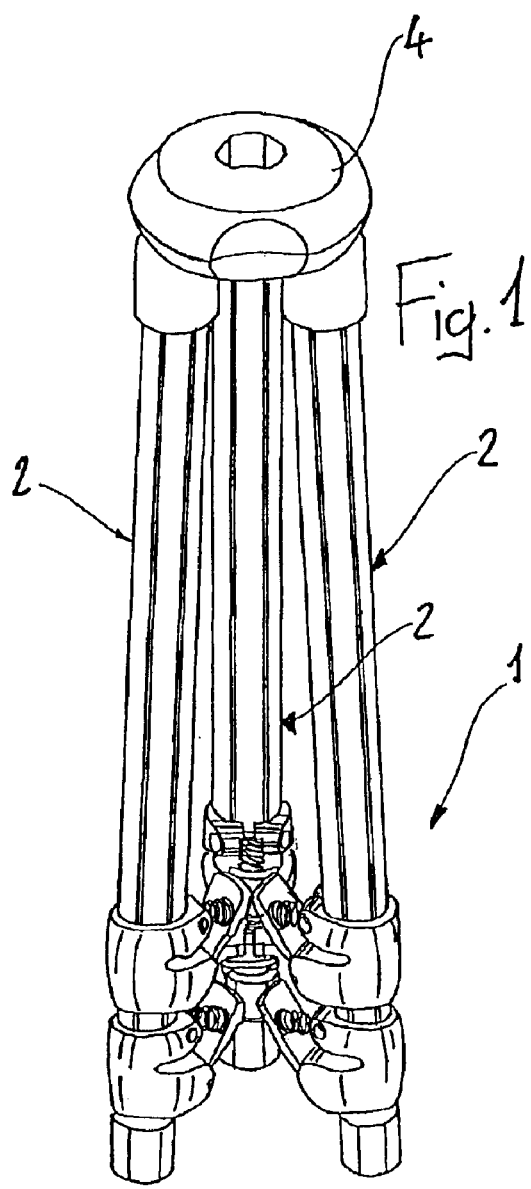
FIG. 1 is a perspective view of a photographic tripod according to the invention, in the semi-open position.
Figure 3:
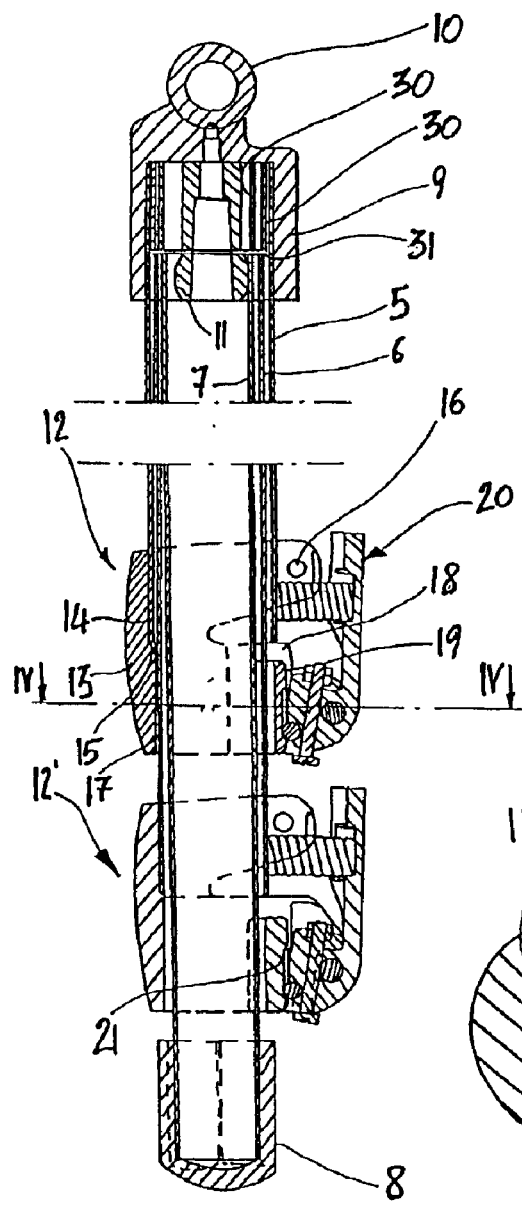
FIG. 3 is a longitudinal section through a leg of the tripod of the previous drawings.
Figure 5:
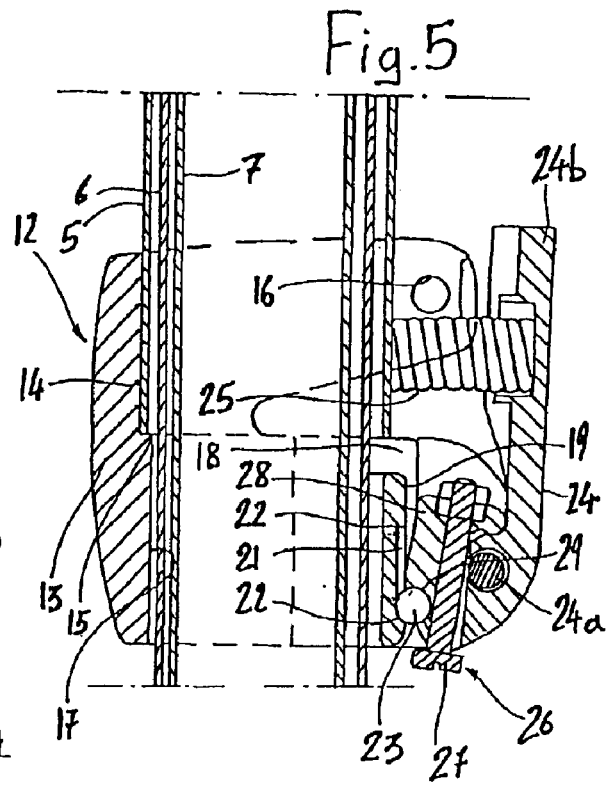
FIG. 5 is a view showing a detail of FIG. 3, on an enlarged scale.
Figure 4:
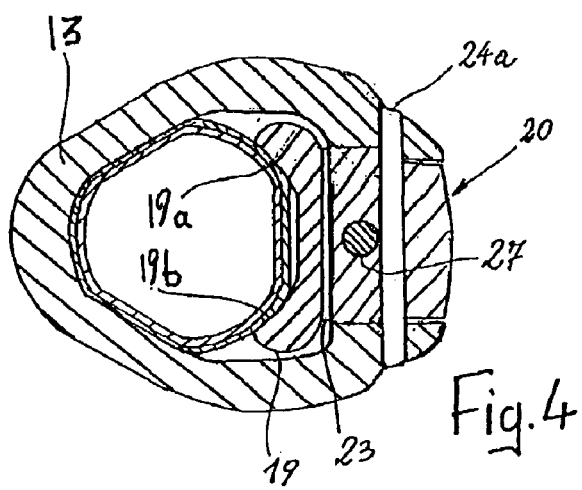
FIG. 4 is a section taken on the line IV—IV of FIG. 3.

If the legs are squeezed against one another by encircling the tripod with both hands, the levers 24 are pressed against one another and move from the locking position of FIG. 1 to the release position of FIG. 3. The pads 19 are thus moved away from the surfaces of the corresponding leg elements, substantially cancelling out the restraining effect. The legs nevertheless remain in the retracted position owing to the friction between the element 7 and the plug 11.

If, however, a slight pulling force is exerted and inertial force is also utilized by an abrupt downward movement of the tripod, the two elements 6, 7 slide out and the legs are thus telescopically extended. As has been seen, the pad restraining system permits outward adjustments of the legs but not movements in the opposite direction, unless the levers 24 are deliberately pressed.

In order to close up the tripod after use, it suffices to squeeze the legs against one another, once again pressing the levers 24 together and consequently releasing the pads 19. The legs can now be brought back to the retracted position simply by bearing on the ground.

The invention thus achieves the objects proposed and offers many advantages, amongst which is considerable structural simplicity, improved adaptability offered by the absence of spreaders or other means which limit the possible positioning of the legs, and a very low weight.

What is claimed is:

1. A telescopic stand for optical or photographic apparatus, comprising at least two legs (2) connected to a spider at their first end and, for each leg, at least two elements (5,6,7) which are slidable telescopically relative to one another, locking means (12) on each leg, the locking means (12) being switchable between a locking condition and a release condition in which relative sliding between the elements of the respective leg (2) is prevented at least in one direction while in the locking condition, or is unrestricted in the release condition, respectively, all the locking means being simultaneously switched to the release condition in at least one predetermined condition of relative positioning of the legs (2), characterized in that the locking means comprise respective facing and opposed appendages (24b) which project towards one another from the respective legs (2) and, when pressed against one another, interact with one another in the release condition to simultaneously unlock all of the locking means (12) when the legs (2) are gathered together in the predetermined condition of relative positioning thereby simultaneously releasing one of said elements of each of said legs.

2. The telescopic stand according to claim 1 in which the appendages (24b) are resilient with resilience (25) tending to urge them away from the respective legs(2), towards the locking position.

3. The telescopic stand according to claim 1 in which the locking means comprises a collar element (13) having an opening (18), a pad movable radially in the opening, and a level control device (20) for pushing the pad (19) into restraining contact with the corresponding telescopic element (5, 6, 7).

4. The telescopic stand according to claim 3 in which the level control device (20) comprises means (26) for adjusting the restraining load applied by the resilience (25).

5. The telescopic stand according to claim 4 in which the means (26) for adjusting the restraining load comprises a cylindrical element (23) interposed between a level (24) of the control device and the pad (19), the cylindrical element (23) being housed in a groove (29) of adjustable width in the lever (24).

6. The telescopic stand according to claim 5 in which the cylindrical element(23) is housed in the pad (19) in a track terminating at least one of its ends in a tab element (22) in order to bring about a unidirectional restraining effect.

7. The telescopic stand according to claim 1 in which the locking means (12) has a unidirectional effect and is active in the direction in which the telescopic elements (5, 6, 7) return into one another.

8. The telescopic stand according to claim 1 in which a restraining means (11) is provided for restraining each leg (2) in the retracted position in the absence of an initial extension stress thereon.

9. The telescopic stand according to claim 8 in which the restraining means comprises a restraining plug (11) active on the innermost element (8) of each leg (2).

* * * * *